March 1, 1966 N. LAVEDAS 3,237,910
CAKE PAN
Filed July 2, 1962

INVENTOR.
NICK LAVEDAS
BY *Whittemore, Hulbert & Belknap*
ATTORNEYS

United States Patent Office 3,237,910
Patented Mar. 1, 1966

3,237,910
CAKE PAN
Nick Lavedas, 199 E. Arizona, Detroit 3, Mich.
Filed July 2, 1962, Ser. No. 206,959
1 Claim. (Cl. 249—117)

This application is a continuation-in-part of my copending application Serial Number 95,454, filed March 13, 1961, now abandoned. The present invention relates to the baking of bread, cake, or the like and more particularly to a baking pan for the production of articles of this nature.

Housewives are constantly faced with the problem of baking a cake such that the top surface of each of the layers is substantially flat and straight to facilitate stacking of the various layers and the subsequent decoration of the cake. In the past, the housewives have each utilized a baking pan having a substantially flat bottom. The dough or batter is initially placed in the baking pan to a predetermined substantially uniform depth with the help of a spatula, spoon, or other similar utensil. The baking pan is then placed in an oven heated to the requisite temperature for baking and maintained therein until the dough has been sufficiently baked. Due to certain reactions which may take place in the dough during the baking thereof, or possibly due to the uneven distribution of heat within the oven or at the bottom of the baking pan, it has been found that the outer surface of the baked article gradually bulges in an outwardly direction in a generally convex pattern, thereby making it very difficult to stack various layers and to decorate the composite article or cake.

The gradual bulging of the outer surface of the baked article is believed due, in part, essentially to the fact that the dough at the outer zone of the baking pan is baked sooner than the dough at the inner zone of the pan, since the dough at the outer zone is not only baked by the heat radiated at the bottom thereof but also by the heat radiated by the annular rim. The heat applied to the dough in the outer zone from the corresponding bottom zone and the annular rim of the baking pan bakes the dough faster or at a greater rate than the heat at the inner zone will bake the dough above it since less heat is concentrated at the inner zone than at the outer zone. The faster the dough bakes, the less chance the dough has to rise. Since the dough in the center does not bake as fast as the dough in the outer zone, a crown or convex-shaped surface results. The amount of rise is therefore dependent on the volume of dough in the inner zone and the volume of dough in the outer zone of the baking pan.

The present invention has overcome this problem by shaping the bottom of the baking pan in such a manner that the ratio of the volume of dough in the outer bottom zone to the inner bottom zone is greater than the ratio of the prior art baking pan having a substantially flat bottom as described previously. With such a construction the dough at the inner zone still rises at a slower rate than the dough at the outer zone, but since less dough is provided in the center zone, the amount of rise will be less than heretofore obtained. The net rise of the inner zone will be less than obtained heretofore and it has been found through actual practice that the resulting net rise is substantially equal to the net rise of the outer zone so that a substantially flat outer surface results on the baked article.

It is an object of the present invention to provide a baking pan having a bottom which is so shaped so as to aid in the baking of an article having a substantially flat top surface.

Another object of the present invention is to provide a baking pan of the aforementioned type which is particularly adaptable in baking layers of a cake, said layers having substantially flat top surfaces so as to facilitate the stacking of the layers and the subsequent decoration of the cake.

Still another object of the present invention is to provide a baking pan comprising an open top unitary receptacle having a centerline, said receptacle including a bottom which is provided with an upstanding continuous uninterrupted rim around the periphery thereof, said bottom having continuous uninterrupted inner and outer zones, the bottom portion of the outer zone gradually sloping upwardly and inwardly from the intersection with the rim to gradually merge into the inner zone, and the bottom portion of the inner zone gradually sloping downwardly and inwardly from the point of merger of the zones toward the aforesaid centerline where the adjacent surfaces thereof merge.

A further object of the present invention is to provide a baking pan of the aforementioned type wherein the area of the bottom portion of the outer zone is substantially larger than the area of the bottom portion of the inner zone.

A still further object of the present invention is to provide a baking pan of the aforementioned type wherein the depth of the receptacle at the outer periphery of the bottom zone is substantially equal to the depth of the receptacle measured along the aforesaid centerline.

Another object of the present invention is to provide a baking pan of the aforementioned type wherein the depth of the receptacle at the outer periphery of the bottom zone is greater than the depth of the receptacle measured along the aforesaid centerline.

Still another object of the present invention is to provide a baking pan of the aforementioned type wherein the receptacle has a rectangular plan.

A further object of the present invention is to provide a baking pan of the aforementioned type wherein the receptacle has a circular plan.

Figure 1:
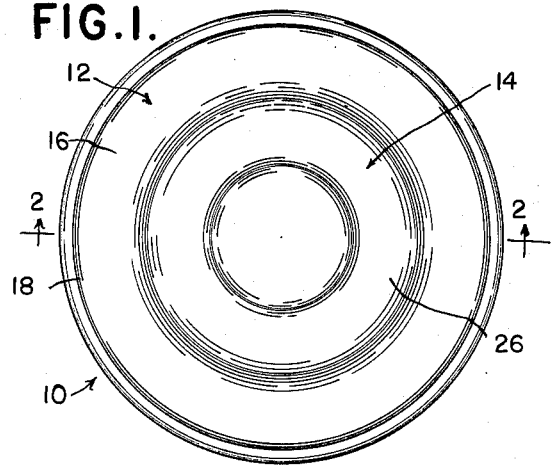
FIGURE 1 is a plan view of a baking pan of circular configuration.
Figure 2:
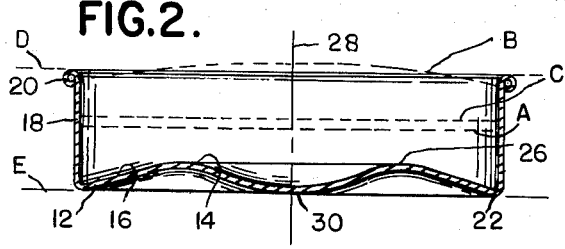
FIGURE 2 is a sectional view taken on line 2—2 of FIGURE 1.

Referring now to FIGURES 1 and 2 of the drawings, a baking pan 10 of circular configuration is illustrated. The baking pan 10 has a bottom 12 which is divided into inner and outer zones 14 and 16 respectively. A circumferentially extending rim 18 is integrally formed with and turned upwardly from the outer edge of the outer zone 16 and is provided with an annular circumferential bead 20 at the upper end thereof.

The bottom portion of the outer zone 16 gradually slopes upwardly and inwardly from the intersection with the rim 18, as designated by the numeral 22, to a position where it gradually merges into the inner zone 24 as designated by the numeral 26.

The bottom portion of the inner zone 14 gradually slopes downwardly and inwardly from the point of merger 26 of the zones 14 and 16 toward the centerline 28 of the baking pan 10 where the adjacent surfaces of the inner bottom zone 14 merge. With such a construction the inner bottom zone 14 forms part of a sphere as best illustrated in FIGURE 2. The bottom 12 may be formed by suitable metal forming equipment, including a spherically shaped tool for forming the inner zone 14 of the bottom 12.

When using a baking pan having a flat bottom, the dough is placed in the pan to a depth represented by the dotted line A in FIGURE 2. In the past, if a flat bottom was utilized the resulting top surface of the baked article was substantially convex as represented by the curved line B in FIGURE 2.

Assume that the same amount of dough or batter is utilized for baking a cake utilizing the present invention as was required in a baking pan having a substantially flat bottom surface. The top surface of the batter is designated by the line C in FIGURE 2. Since the area of the outer bottom zone 16 is substantially larger than the area of the inner bottom zone 14, the ratio of the dough concentrated or located in the outer zone 16 to the dough located in the inner zone 14 is greater than in a baking pan having a flat bottom surface. The dough in the outer zone 16 will rise at the same rate as in the prior art baking pan but the top surface thereof will obtain a slightly higher level since more dough is concentrated in the outer zone than in the prior art construction. Since less dough is concentrated in the inner zone 14, the net rise will be less than with the prior art construction. It has been found by experience that the amount of rise of the top surface of the dough in the inner zone 14 is substantially equal to the amount of rise of the top surface of the dough in the outer zone 16 so as to result in a substantially flat surface throughout its extent as designated by line D in FIGURE 2.

In FIGURE 2 the lowest portion 30 of the inner bottom zone 14 is substantially tangent to a plane E which abuts and is normal to the rim 18.

A practical embodiment of the present invention has an inside diameter of approximately 8¾" and an outside diameter of 8⅞". The inner zone has an outside diameter of approximately 2". The rim has a height of approximately 1¼". The height of the outer zone at the point of merger with the inner zone is approximately ¼". However, it should be understood that this height may vary to suit various applications and is therefore not critical. The baking pan may, as an example, be made from aluminum or other materials well known in the art.

It should be further understood that if the various dimensions of the baking pan are changed, that the depth of the inner zone or dimple will also change.

Figure 3:
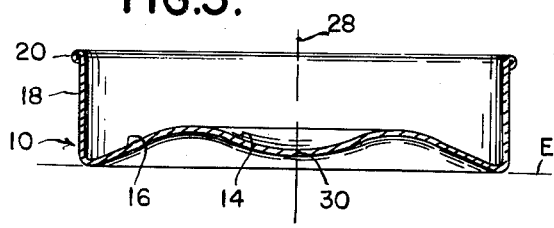
FIGURE 3 is a sectional view somewhat similar to FIGURE 2 and illustrating another embodiment of the present invention.

FIGURE 3 shows a modification of the embodiment illustrated in FIGURE 2, the essential difference being in the shape of the bottom 12. The same numeral designations are utilized to show similar parts.

It should be observed that the outer bottom zone 16 in FIGURE 3 has a greater slope than the embodiment illustrated in FIGURE 2, while the inner zone has a smaller slope than the corresponding portion in FIGURE 2. With such a construction the lowest portion 30 of the inner bottom zone 14 is spaced upwardly from the plane E.

Figure 4:
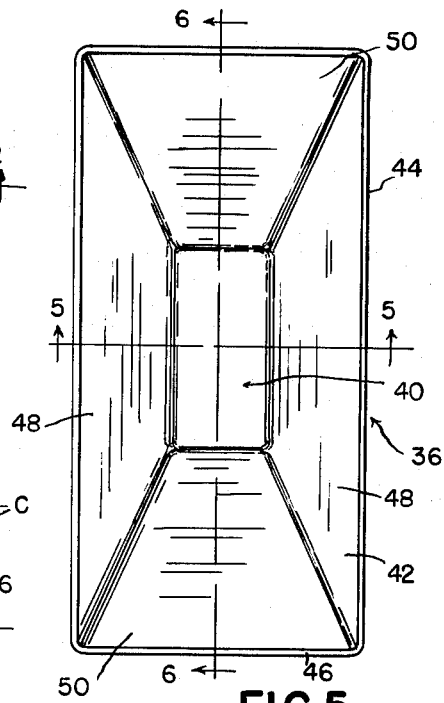
FIGURE 4 is a plan view of a baking pan of rectangular configuration.
Figure 5:
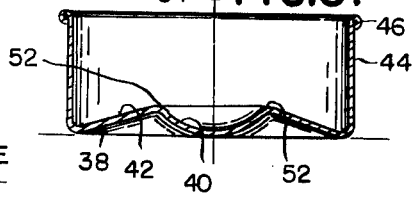
FIGURE 5 is a sectional view taken on line 5—5 of FIGURE 4.
Figure 6:
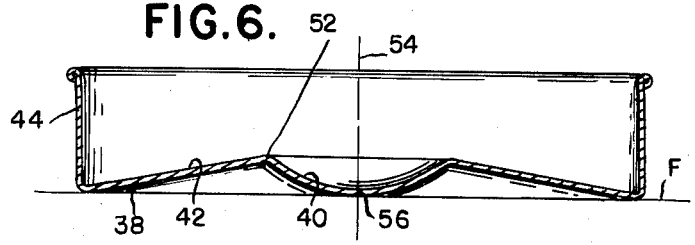
FIGURE 6 is a sectional view taken on line 6—6 of FIGURE 4.

Another embodiment illustrated in FIGURES 4–6 shows a baking pan 36 of rectangular configuration and unitary construction. The baking pan 36 operates on the same principle as the baking pan 10 illustrated in FIGURES 1–3.

The baking pan 36 includes a bottom 38 which is divided into inner and outer zones 40 and 42 respectively. A rectangularly shaped rim 44 is integrally formed with and extends upwardly from the outer periphery of the bottom 38. The upper edge of the rim 44 is provided with an inwardly turned bead 46.

The outer zone 42 includes a pair of side walls 48 and a pair of end walls 50 which slope gradually upwardly and inwardly from the inner section of the outer zone 42 with the rim 44 to gradually merge with the inner zone 40 as indicated by the numeral 52.

The inner zone 40 gradually slopes downwardly and inwardly from the aforesaid area of merger 52 toward the centerline 54 of the baking pan 36 where the surfaces of the inner bottom zone 40 gradually merge. The inner bottom zone 40 forms a part of a sphere as is the case in the other embodiments.

It should be noted that the lowest portion 56 of the inner bottom zone 40 is tangent to the plane F which is perpendicular to and abuts the rim 44 as illustrated in FIGURE 6.

The pan 36 may be made from aluminum or other material well known in the art. The height of the outer zone at the point of merger with the inner zone may be, as an example, ³⁄₁₆" to ⁵⁄₁₆". This dimension would, of course, depend on the particular size of the pan.

After the baked article is removed from the baking pan 10 or 36 and left to cool, it has been found that the curved surface in the bottom of the cake will gradually disappear due to the weight of the case. However, the top surface thereof remains flat and straight. With such a construction, the cake has a substantially uniform thickness throughout so as to facilitate stacking of the layers and decorating the cake.

It is well known that the consistency of the dough or batter may vary for different articles. Generally, a soft batter will seek its own level and therefore with the present invention, less batter will be located in the center of the baking pan making for less rise in the center.

The convex surface B mentioned previously is due to an "air pocket" which is formed during baking. The dimpling of the center zone is very essential to the outcome of the product.

The rim of the baking pan has no effect on the baked article other than to provide the design of product desired which may take one of the forms as illustrated or take the form of a heart, tree, square design or the like. In each design the same technique is followed; namely, the gradual raising of the center and the dimpling at the crown of raise.

With the present invention the even baking or cake pan distributes batter, dough, or the like so that the batter has the right amount at the right areas to form a cake or bread with substantially the same thickness throughout to facilitate stacking and decorating. Such a construction provides for a thoroughly and evenly cooked product.

The drawing and the foregoing specification constitute a description of the improved cake pan in such full, clear, concise, and exact terms as to enable any person skilled in the art to practice the invention, the scope of which is indicated by the appended claim.

What I claim as my invention is:

A baking pan for making a cake from dough comprising an open top unitary receptacle, said receptacle having a circular bottom and a continuous uninterrupted vertical, cylindrical rim extending upwardly from the said bottom around the periphery thereof, the upper edge of said rim terminating in an outwardly turned continuous uninterrupted flange, said bottom consisting only of a circular central inner zone and an annular outer zone, the outer edge of said annular outer zone merging with the lower edge of said rim and said outer zone gradually sloping upwardly and inwardly therefrom, the outer edge of said inner zone merging with the inner edge of said outer zone and said inner zone sloping gradually downwardly from its outer edge to its center, the area of said outer zone being substantially larger than the area of said inner zone, with more of the dough for making the cake concentrated above the outer zone than above the inner zone so that the dough upon application of sufficient heat will rise substantially uniformly to result in a cake having a substantially flat outer surface, the depth of the receptacle at the outer periphery of said bottom being substanially equal to or greater than the depth of the receptacle measured through the center, the depth of said receptacle at the outer periphery of said bottom being substantially less than one-half the radius of the receptacle, said rim being imperforate throughout its entire circumferential and vertical extent and providing a smooth continuous uninterrupted inner annular surface contoured to mold the side wall of the cake baked in the pan.

References Cited by the Examiner

UNITED STATES PATENTS 1,718,668  6/1929  Smythe

FOREIGN PATENTS 53,403   6/1911   Switzerland.
96,637   11/1922  Switzerland.

LOUIS G. MANCENE, *Primary Examiner.*

THERON E. CONDON, *Examiner.*